May 9, 1933.　　　　W. A. MARRISON　　　　1,907,425

PIEZO ELECTRIC RESONATOR

Filed Dec. 19, 1928　　　3 Sheets-Sheet 1

INVENTOR
W. A. MARRISON
BY
Guy T. Morris
ATTORNEY

May 9, 1933.  W. A. MARRISON  1,907,425
PIEZO ELECTRIC RESONATOR
Filed Dec. 19, 1928   3 Sheets-Sheet 2

INVENTOR
W. A. MARRISON
BY
Guy T. Morris
ATTORNEY

May 9, 1933.  W. A. MARRISON  1,907,425
PIEZO ELECTRIC RESONATOR
Filed Dec. 19, 1928  3 Sheets-Sheet 3

INVENTOR
*W. A. MARRISON*
BY *Guy T. Morris*
ATTORNEY

Patented May 9, 1933

1,907,425

UNITED STATES PATENT OFFICE

WARREN A. MARRISON, OF MAPLEWOOD, NEW JERSEY, ASSIGNOR TO BELL TELEPHONE LABORATORIES, INCORPORATED, OF NEW YORK, N. Y., A CORPORATION OF NEW YORK

PIEZO ELECTRIC RESONATOR

Application filed December 19, 1928. Serial No. 327,017.

This invention relates to piezo-electric crystals, and particularly to crystals having small temperature coefficients of frequency, and methods of cutting such crystals and mounting them for connection in an electric circuit.

Application Serial No. 497,783 filed November 24, 1930, and application Serial Nos. 492,668 and 492,669, filed November 1, 1930 are divisions of this application. Application Serial No. 492,668 claims the subject matter relating to disc-shaped crystals and illustrated in Fig. 2. Application Serial No. 492,669 claims the subject matter relating to ring-shaped resonators with electrodes for exciting said resonators at a harmonic of the resonant frequency and illustrated in Figs. 8, 9 and 10. Application Serial No. 497,783, claims the subject matter relating to rectangular-shaped crystals and means for controlling the relative vibrations in the different directions and illustrated in Figs. 1, 11, 12, 13, 14 and 15.

The advantages of utilizing the piezoelectric effect of substances possessing such properties in the control of electrical oscillations of constant frequency have been known for some time. The uses for a constant frequency control are constantly increasing as well as the need of control within more rigid limits. Such uses include the control of broadcasting stations on their assigned wave lengths, control of the frequency of the local oscillations in heterodyne receivers, of sending and receiving sets in picture transmission and television, avoiding the necessity of a synchronization channel, of carrier waves in carrier telephony and telegraphy and of laboratory reference standards.

An object of this invention is to provide a piezo electric resonator whose resonant frequency of vibration does not change with variations in temperature.

Another object of this invention is to provide a resonator holder in which the resonator is free to vibrate with a minimum of external pressure applied to it at points of vibration and in which the spacings between the electrodes and resonator are maintained at a constant value.

A feature of this invention is a piezo electric resonator cut in the shape of a ring or toroid.

Another feature of this invention is a piezo electric resonator cut so as to form a toroid, with the hole in the center shaped to be approximately elliptical.

Another feature of this invention is a piezo electric resonator having a plurality of holes in it.

Another feature of this invention is a toroidal resonator having its central opening shaped so that the radial dimensions of the hole are smallest in a plane through the middle of the crystal and greatest in planes through its outer surfaces.

Another feature of this invention is a crystal holder whose electrodes are spaced apart by a material having a temperature coefficient of expansion approximately equal to that of the piezo electric substance used, but acting in an opposite sense, so that the space between the electrodes remains constant.

In the drawings Fig. 1 shows a series of piezo-electric resonators cut from a crystal, the successive resonators from left to right each being formed by cutting down the thickness of the resonator to the left, so that they are of uniform cross-sectional area;

Figure 1:
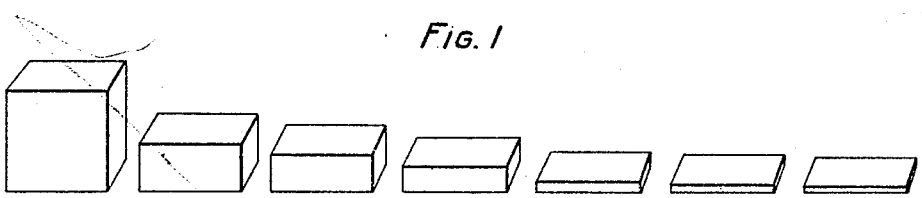

The stiffness, and the temperature coefficient of stiffness, of quartz crystals are different along different axes. The effective stiffness along any given axis is the sum of at least two effects, one being the usual mechanical stiffness, such as exists in ordinary isotropic substances, and another being due to the reaction of the electric field set up within and around a piece of mechanically strained piezo active material.

When an elastic body is deformed in a given direction by a force applied in that direction, there is a corresponding, but smaller, deformation in the perpendicular directions, as well as a change in volume. When a quartz resonator is set in resonant vibration, there is a large periodic change of length in one direction called the direction of vibration, and a vibration of the same frequency in a transverse direction. The transverse vibration is due partly to the mechanical tendency of the material to maintain constant volume, partly to the mechanical coupling between the two modes of vibration, and partly to the electrical coupling between the electrodes and the resonator perpendicular to the principal direction of vibration. Thus the effective stiffness which determines the resonant frequency of a resonator in a given mode is a complex quantity dependent on the relative dimensions along different resonator axes, the orientation with respect to the original crystal axes, the size, number, spacing and arrangement of electrodes about the resonator, the voltage impressed upon the resonator in various directions in relation to the dimensions and orientation of the resonator and the impedance of the electrical circuit to which the resonator is coupled.

Because of the various factors above mentioned which determine the stiffness characteristics for given modes of vibration there results a similar complexity as to the temperature coefficients of stiffness for the corresponding modes of vibration, hence it tends to result that the temperature coefficient of stiffness, and therefore the frequency, of a resonator, in a given mode, may be varied over a considerable range by suitably proportioning the resonator.

The inherent temperature coefficient of frequency is different along an electrical axis of a crystal from that in a perpendicular direction along a crystallographic axis.

Thin plates of relatively large area cut so that their long dimensions are parallel to the optical and electrical axes have a positive temperature coefficient of frequency for vibration along the short dimension, while thin plates of relatively large area cut so that their long dimensions are parallel to the optical and crystallographic axes have a negative coefficient. If a plate is cut from a quartz crystal in the plane of the optical and electrical axes as above but having a sufficient thickness in proportion to its cross-sectional area, such as that shown on the left in Fig. 1, it will be found to have a small negative temperature coefficient of frequency. If a portion of its surface is removed, the cross-sectional area remaining constant while the thickness diminishes, the temperature coefficient becomes less negative, or more nearly positive. If successive tests are made with progressively decreasing thicknesses of resonators having the same cross-sectional area, such as those shown from left to right in Fig. 1, it will be found that as the proportion of the thickness of the resonator to the cross-sectional area decreases, the temperature coefficient of frequency of the resonator for vibrations along the short dimensions will rise from negative through zero to positive values. This is apparently due to the mutual dependence of different vibrations, and to the opposite temperature coefficients in perpendicular directions.

If a disc-shaped plate is cut from a quartz crystal in the plane of the electrical and optical axes having a sufficiently large cross-sectional area in proportion to its thickness, it will be found to have a positive temperature coefficient of frequency similarly as a plate of Fig. 1 of corresponding thickness.

If an outer rim is removed and another measurement is taken of the resulting disc, having greater thickness in proportion to its cross-sectional area, it will be found to have a smaller positive temperature coefficient of frequency. If another rim is removed from the smaller plate, the temperature coefficient of frequency of the resulting disc will again be found to have decreased. It will continue to decrease, passing through zero to negative values.

Figure 2:
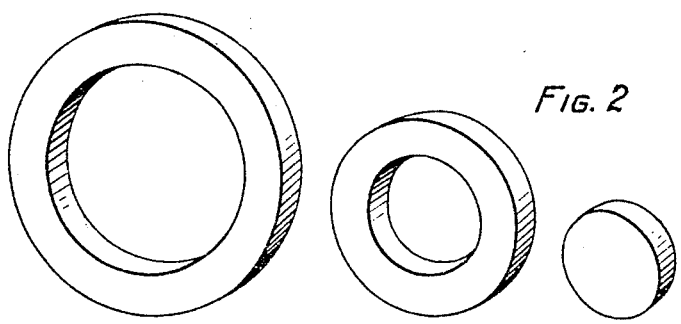
Fig. 2 shows a series of piezo-electric resonators formed from a crystal, the one in the middle having been cut from the one at the left and the one at the right having been cut from the one in the middle, so that they are of uniform thickness.
Figure 3:
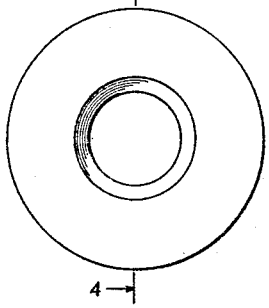
Fig. 3 is a view of a toroidal resonator shaped as hereinafter described.
Figure 4:
Fig. 4 is a cross-sectional view along the line 4—4 of Fig. 3.

A resonator cut in the plane of the optical and electrical axes, and made in the form of a ring as shown in Figs. 2, 3 and 4, which would result from the above series of operations, will have a temperature coefficient less positive than that of a solid disc of the same diameter and thickness. Its temperature coefficient will become less positive or more negative as the ratio of its thickness to cross-sectional area increases. It is possible to make a resonator of ring shape having a zero, or approximately zero, temperature coefficient. By using this shape it is possible to obtain a resonator of greater diameter having a zero temperature coefficient to vibrate at a given frequency than in the rectangular, or disc form. This makes it possible to operate at higher frequencies (that is, with a thinner crystal) with a zero temperature coefficient with a toroidal resonator than would be possible if it were necessary to use other shapes.

If it is desired to cut a quartz resonator of rectangular cross-section designed to vibrate at a desired frequency and having a zero temperature coefficient of frequency, the first step is to cut such a plate from a crystal parallel to the optical and electrical axes of the crystal, of slightly greater thickness than required for this frequency. The plate is then ground to the proper thickness to vibrate at a slightly lower frequency than the frequency desired. The sides of the crystal are then cut down to decrease the cross-sectional area, tests being made at suitable intervals until the point is reached where the plate has a slightly negative temperature coefficient of frequency. A final adjustment of temperature coefficient and frequency is then made by grinding to the proper thickness.

If it is desired to cut a toroidal resonator to have a zero temperature coefficient of frequency, the first step is to cut a disc from a quartz crystal parallel to the electrical and optical axes. The disc is then ground to the proper thickness to vibrate in resonance at a frequency slightly lower than the frequency desired. A second disc is then cut from the first, leaving it in the shape of a toroid, and additional material is ground from the inner or outer surface of the toroid until the point is reached where it has a slightly negative temperature coefficient of frequency. A final adjustment of frequency and temperature coefficient is then made by grinding to the proper thickness.

To cut a disc-shaped resonator with a zero temperature coefficient of frequency, a disc is first cut from a crystal parallel to the electrical and optical axes, ground to the thickness corresponding to a frequency slightly lower than the frequency desired, and its temperature coefficient adjusted by grinding the periphery until the point has been reached where it has a slightly negative temperature coefficient. A final adjustment of frequency and temperature coefficient is then made by grinding to the proper thickness.

It is necessary to make the adjustment in three steps instead of two because the first adjustment of frequency has an effect on the temperature coefficient, and the adjustment of the temperature coefficient has a very slight effect on the frequency. If the exact dimensions are known for a desired frequency with a zero temperature coefficient at a given orientation of the resonator with respect to its crystal axes, it may be cut directly to these dimensions in two steps.

Due to the mutual mechanical coupling between the different modes of vibration, as discussed above, resonance phenomena in one mode will be affected by changes which in a more extended medium should affect only other modes. When the resonant frequencies of other such modes approach harmonic relation to the frequency of the fundamental mode in a resonator, the temperature coefficient of frequency instead of being constant for all temperatures, passes through a minimum value with variations in temperature. This is because the individual temperature coefficients in perpendicular directions are different, and because the coupling between modes varies more rapidly with temperature when the resonant frequencies in different modes are nearly in harmonic relation than when otherwise. It is therefore possible to cut a resonator to have a zero, or very small, temperature coefficient of frequency in a certain temperature range. Such a crystal may be controlled at a given frequency in this rage without the necessity of a precise temperature control.

To cut a resonator to have a non-linear temperature coefficient which is zero at one temperature, it is therefore simply necessary to proportion the resonator so that the vibrations in one mode are in harmonic relation to the vibrations in another mode. That is, the transverse vibrations of a resonator may be at a given fundamental frequency, corresponding to the length of a resonator, and the longitudinal vibrations, corresponding to its thickness, may be at the first, second, third, or any, harmonic thereof.

Reference so far has been to plates cut parallel to the electrical and optical axes of a crystal. Since the temperature coefficient of frequency of a resonator is a function of its orientation with respect to the crystal axes, a resonator having a different orientation must have different proportions to have a zero temperature coefficient of frequency. However the same method may be followed as outlined above, in cutting a resonator at an angle with the crystal axes having a zero temperature coefficient of frequency. That is, a crystal section of any desired shape is first cut from a crystal so that the faces of the crystal section are in planes which make any desired angle with any selected axis of the crystal. The resonator is then ground to a thickness corresponding to a frequency slightly lower than the frequency desired, and its temperature coefficient adjusted by grinding a transverse surface until a point is reached where the crystal section has a slightly negative temperature coefficient. A final adjustment of frequency and temperature coefficient is then made by grinding to the proper thickness.

A resonator of toroidal shape may be improved by shaping the hole so that the diameter of the hole in the resonator is greater at its edges than in a plane through its center, as shown in Figs. 3 and 4. That is, the resonator is so shaped that it will hang on a horizontal peg with only one point of contact between the edge of the inner ridge of the resonator and the peg, and that point in a plane through the center of the crystal, where there is a node. A crystal mounted in this manner will be more stable and will control more power.

Figure 5:
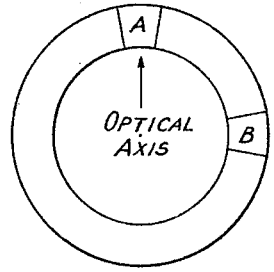
Fig. 5 is a sketch of a toroidal resonator indicating two segments, whose radial dimensions are generally parallel and perpendicular respectively to the optional axis.
Figure 6:
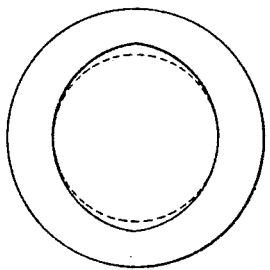
Fig. 6 is a toroidal resonator with its inner annular surface roughly elliptical in shape.

If a toroidal resonator is cut parallel to the optical axis of a quartz crystal, and a section is cut therefrom in the direction of the optical axis, as A, Fig. 5, the section will vibrate at a different frequency than a similar section cut in a direction perpendicular to the optical axis, as B, Fig. 5. This is because the elastic constants for quartz are different parallel and perpendicular to the optical axis. It follows that a resonator may be further improved by changing its radial dimensions. If this is done as shown in Fig. 6, so that a section of given width taken from any portion will vibrate at the same frequency, the resonator will be more stable and will control more power. The resonator may then also be mounted on a horizontal peg so that it will always hang at a point bearing the same relation to the direction of the optical axis.

Figure 7:
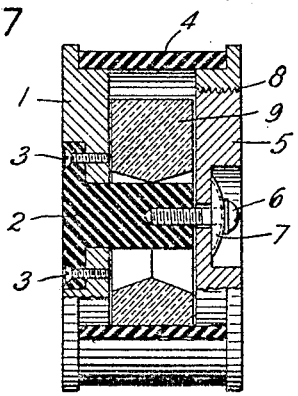
Fig. 7 is a view partly in cross-section of a mounting designed for a crystal such as shown in Fig. 3 or 6.

Such a mounting is shown in Fig. 7 in which a base 1, which serves as an electrode, is counterbored to engage a resonator support 2 which is attached thereto by means of screws 3. The base is flanged to engage a spacer 4 of insulating material which comprises the walls of the holder and spaces the electrodes apart. The resonator support has attached thereto by means of a screw 6 a metallic cover 5 for the holder, which also serves as an electrode. The cover has a counterbored recess to accommodate a helical spring 7 against the pressure of which the screw 6 is threaded into the resonator support. The cover is in two parts which are adapted to engage one another by means of threads 8 so that it may be adjusted with respect to the electrodes and locked in position by means of the spring 7. The cover likewise has a flange adapted to engage the spacer 4. The electrodes and spacer are so selected and designed that the spacing of the electrodes from the crystal 9 is constant after the adjustment by means of the threads 8 has been made, and does not change appreciably with variations in temperature. Any suitable materials may be used, for example, aluminum for the electrodes and pyrex for the collar.

A resonator may, of course, be suspended in a holder at a single point, that point being a node of vibration, in other ways than that shown in these figures. For example, there may be a pivot or projection on the resonator support adapted to engage the inner surface of a resonator at a node of vibration (as in Fig. 16). The resonator also may have an inner groove the edge of which engages such a pivot (see Fig. 17). The resonator and resonator support may be curved to fit together and maintain a constant spacing between the resonator and its electrodes (as in Fig. 18) or these curved surfaces may have different radii of curvature to provide a single point contact (as in Fig. 19). In Figs. 16 to 19 the crystals may be mounted as shown in Fig. 7, the only change in the structure shown in Fig. 7 being in the resonator support 2 and the crystal 9.

In Fig. 8 to Fig. 15, inclusive, there are shown various methods of associating a resonator with its electrodes, and of connecting the electrodes to an electrical circuit.

Figure 8:
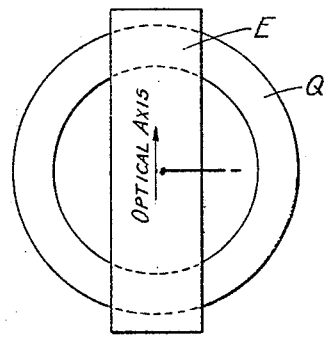
Fig. 8 is a diagrammatic plan of a toroidal resonator with electrodes covering only part of the plane surfaces of the resonator.
Figure 9:
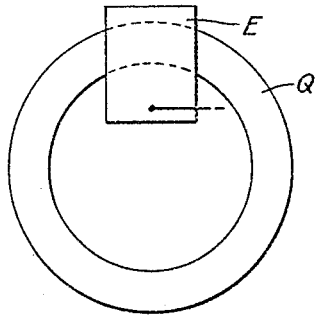
Fig. 9 is a diagrammatic plan of a toroidal resonator with electrodes covering the plane surfaces of one segmental portion only of the resonator.
Figure 10:
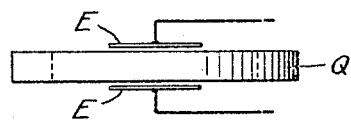
Fig. 10 is an end view of Fig. 8 or 9.

If a ring piezo-electrically active quartz crystal Q, Fig. 8, which has its principal plane parallel to the optical and one of the electrical axes of the crystal is inserted between two electrodes E whose length is equal to or greater than the outside diameter of the ring and whose width is equal to or less than the diameter of the ring, with the long side parallel to the direction of the optical axis, it may be set into resonant vibration having four, six, eight, or any even number of nodes (within limits) approximately evenly spaced around the ring, by impressing a voltage on the electrodes of the frequency of the resonant vibration desired. If the electrodes cover one side only of the ring as shown at E, Fig. 9, the ring may similarly be set in vibration.

Figure 11:
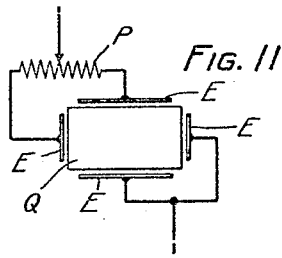
Fig. 11 is a diagrammatic view of a resonator with two pairs of electrodes, one pair being electrically connected through a resistance having a variable tap, the other pair directly, and the electrodes of each pair being perpendicular to one another.

It has been previously noted herein that a piezo-electric resonator tends to have a temperature coefficient of frequency of opposite sign depending on whether the resonator is cut in the plane of the optical and electrical axes, or in the plane of the optical and crystallographic axes and that the resultant temperature coefficient of a resonator depends upon the extent of its vibration, and the corresponding temperature coefficients, in both directions. Analogously to the above the opposite sign rule is applicable to the case of vibrations parallel to the electrical and crystallographic axes in a given resonator. It is therefore possible to adjust the coefficient of a resonator by exciting it to greater vibration in one direction than in the other. This may be done to a certain extent by means of a differential adjustment of the voltage applied to perpendicular surfaces, as shown in Fig. 11, for example, where a resonator Q has four electrodes E, as shown, and two adjacent electrodes are connected through a potentiometer P to which the exciting voltage is applied. By moving the contact point along the potentiometer in a desired direction the temperature coefficient of frequency may be adjusted accordingly.

The relative amount of vibration in any direction, and hence the temperature coefficient of frequency of a resonator, may also be controlled by a small amount by connecting the electrodes directly instead of through the potentiometer and adjusting the relative potential applied by changing the spacing between the electrodes and the resonator or by changing the area of the crystal exposed to the electrodes.

Figure 12:
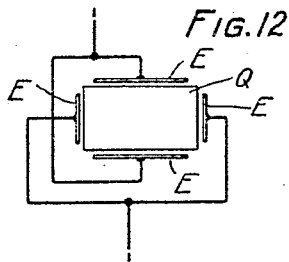
Fig. 12 is a diagrammatic view of a resonator with two pairs of electrodes electrically connected, the electrodes of each pair being perpendicular to one another.
Figure 13:
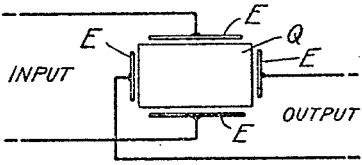
Fig. 13 is a diagrammatic view of a resonator with two pairs of electrodes, the electrodes of each pair being parallel to one another, one pair constituting an input coupling and the other an output coupling to the resonator.

The coupling to the crystal may be varied, and its temperature coefficient of frequency adjusted a small amount by changing the spacing of the electrodes, or by the other means suggested above, with the coupling arrangements shown in Figs. 12 and 13.

Figure 14:
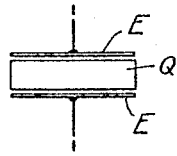
Fig. 14 is a diagrammatic view of a piezoelectric resonator with two electrodes.
Figure 15:
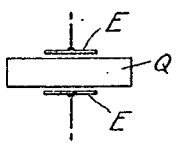
Fig. 15 is a diagrammatic view of a piezoelectric resonator with two electrodes of smaller area than those in Fig. 14.
Figure 16:
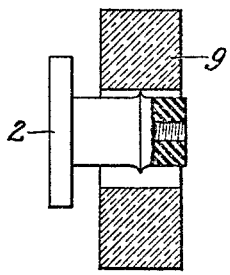
Fig. 16 is a view of two of the elements shown in Fig. 7, illustrating a modification of these elements.
Figure 17:
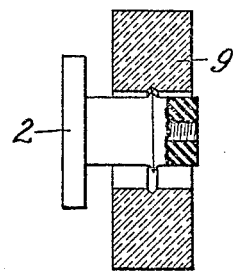
Fig. 17 is another modification of the same elements shown in Fig. 16.
Figure 18:
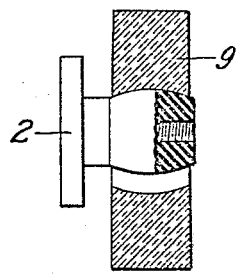
Fig. 18 is still another modification of the elements shown in Fig. 16.
Figure 19:
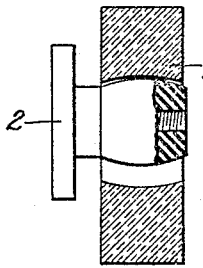
Fig. 19 is yet another modification of the elements shown in Fig. 16.

The size of the electrodes has also been mentioned as affecting the temperature coefficient of frequency of a piezo-electric resonator. It is possible to change the coefficient of a resonator, or if it has a low coefficient, it is possible to adjust it to zero, by changing the size of the electrodes. This is shown in Figs. 14 and 15 in which the resonator will have a different coefficient due to the difference in size of the electrodes.

Advantages of resonators which have a zero temperature coefficient of frequency are that the necessity for temperature controlling means is avoided, and, furthermore, as a resonator heats up, due to load applied to it, the frequency does not change, due to either the initial heating or to variations in load.

The various methods of adjustment of the temperature coefficient mentioned herein, particularly in connection with Figs. 11 to 15, are useful in the final adjustment of a resonator. It may be that in preparing a resonator to have a zero temperature coefficient in the manner described a point is reached where the temperature coefficient has been reduced to a very small value. It may then be easier to make a final adjustment by one or more of the other methods described than by further shaping.

What is claimed is:

1. A ring-shaped piezo-electric resonator having its radial dimensions so varied that a section of a given width taken from any part of the ring will have a constant resonant frequency.

2. A ring-shaped piezo-electric resonator having an inner ridge for suspension on a horizontal peg.

3. A quartz crystal piezo-electric resonator cut parallel to its electrical and optical axes and having its dimensions so related that it has a very small temperature coefficient.

4. The method of producing a piezo-electric resonator having a very small temperature coefficient of frequency which comprises forming a toroid from a quartz crystal in the plane of its electrical and optical axes, of relatively large cross-sectional area and of slightly greater thickness than that corresponding to a frequency desired, reducing the cross-sectional area of said toroid to a point slightly beyond that corresponding to a zero temperature coefficient, and then reducing the thickness to correspond to the frequency desired.

5. The method of producing a quartz crystal piezo-electric resonator with a very small temperature coefficient of frequency, which comprises forming a resonator from a quartz crystal, of a relatively large cross sectional area and of a thickness corresponding to a frequency slightly lower than the frequency desired, reducing the cross-sectional area of said resonator to the point at which it has a slightly negative temperature coefficient of frequency, and then reducing the thickness sufficient to give the desired value of temperature coefficient and frequency.

6. A quartz crystal resonator comprising a slab of a piezo-electric quartz crystal, the principal plane of which is parallel to the optical and one of the electrical axes of the crystal whose ratio of thickness to cross-sectional area is such that it has a substantially zero temperature coefficient.

7. A ring-shaped resonator cut from a slab of quartz, the principal plane of which is parallel to the optical and one of the electrical axes of the quartz.

8. A piezo-electric resonator ring cut from a plate of quartz, the principal plane of said ring extending parallel to the optical and one of the electrical axes of the quartz and the thickness of the ring bearing such a relation to its radial dimensions as to give said ring a natural resonant frequency which is substantially constant at various atmospheric temperatures.

9. A ring-shaped quartz crystal piezo-electric resonator having its principal plane parallel to the optical and one of the electrical axes of the quartz crystal and having its thickness and radial dimensions so related that said resonator has a substantially zero temperature coefficient of frequency, said resonator having an inner ridge for suspension on a horizontal peg.

10. A ring-shaped piezo-electric quartz crystal resonator having an inner groove for suspension on projections on a horizontal peg, the principal plane of said ring being parallel to the optical and one of the electrical axes of the quartz crystal.

11. A toroidal quartz crystal piezo-electric resonator having an inner edge for suspension on a horizontal peg, the principal plane of said resonator extending parallel to the optical and one of the electrical axes of the crystal, and the radial dimensions and thickness of said resonator being so related that the resonant frequency of vibrations of said resonator in the different modes of vibration are in approximate harmonic relationship with each other whereby the temperature coefficient of frequency of said resonator is substantially zero.

In witness whereof, I hereunto subscribe my name this 17th day of December, 1928.

WARREN A. MARRISON.